(12) United States Patent
Bressanelli et al.

(10) Patent No.: US 10,299,162 B2
(45) Date of Patent: May 21, 2019

(54) ROBUST HEADER COMPRESSION (ROHC) TECHNIQUES FOR A DYNAMICALLY CHANGING EXTENSION BIT

(71) Applicant: QUALCOMM Incorporated, San Diego, CA (US)

(72) Inventors: Dominique Francois Bressanelli, Eschborn (DE); Deepak Sah, Hyderabad (IN); Saket Bathwal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/407,045

(22) Filed: Jan. 16, 2017

(65) Prior Publication Data

US 2018/0206151 A1    Jul. 19, 2018

(51) Int. Cl.
*H04W 28/06* (2009.01)
*H04L 1/18* (2006.01)
*H04L 29/06* (2006.01)

(52) U.S. Cl.
CPC ........... *H04W 28/06* (2013.01); *H04L 1/1812* (2013.01); *H04L 65/608* (2013.01); *H04L 65/80* (2013.01); *H04L 69/04* (2013.01); *H04L 69/22* (2013.01)

(58) Field of Classification Search
CPC .............................. H04L 69/04; H04W 28/06
See application file for complete search history.

(56) References Cited

U.S. PATENT DOCUMENTS

| 7,035,287 | B2 |  | 4/2006 | Tourunen et al. |
| 7,430,617 | B2 | * | 9/2008 | Walsh ................. H04L 12/1868 370/392 |
| 7,817,628 | B2 |  | 10/2010 | Pelletier et al. |
| 8,340,129 | B2 | * | 12/2012 | Kim ...................... H04L 65/607 370/471 |
| 9,282,171 | B2 |  | 3/2016 | Ambriss et al. |

(Continued)

OTHER PUBLICATIONS

ISA/EP, International Search Report and Written Opinion of the International Searching Authority, Int'l Application No. PCT/US2017/067415, Feb. 22, 2018, European Patent Office, Rijswijk, NL, 14 pgs.

(Continued)

*Primary Examiner* — Rhonda L Murphy
(74) *Attorney, Agent, or Firm* — Holland & Hart LLP

(57) ABSTRACT

Methods, systems, and devices for wireless communication are described. Different robust header compression (RoHC) schemes may be used when a change in a header extension flag between packets of a communication session is determined. For example, a transmitting device may determine a value of a header extension flag in a packet has changed with respect to header extension flags in preceding packets. Upon detecting the change in the header extension flag, the device may compress the header using different RoHC schemes. For instance, the device may compress the header by reverting to an initialization and refresh (IR) state. Additionally or alternatively, the device may compress the header using a compression profile that refrains from compressing a certain portion of the header. In some cases, the RoHC scheme used for compressing the header may be based on how frequently the value of the extension flag changes between packets.

27 Claims, 14 Drawing Sheets

(56) References Cited

U.S. PATENT DOCUMENTS

| | | |
|---|---|---|
| 2011/0158166 A1 | 6/2011 | Lee et al. |
| 2015/0049678 A1* | 2/2015 | Speight ................ H04W 72/00 |
| | | 370/329 |
| 2016/0241685 A1* | 8/2016 | Shah ....................... H04L 69/04 |

OTHER PUBLICATIONS

Pelletier G., et al., "RObust Header Compression Version 2 (ROHCv2): Profiles for RTP, UDP, IP, ESP and UDP-Lite; rfc5225.txt," 5. JCT-VC Meeting; 96. MPEG Meeting; 16-3-2011-23-3-2011; Geneva; (Joint Collaborative Team on Video Coding of ISO/IECJTC1/SC29/WG11 and ITU-TSG.16); URL: http://wftp3.itu.int/av-arch/jctvc-site/, Internet Engineering Task Force, IETF, CH, Apr. 1, 2008 (Apr. 1, 2008), XP015057212, pp. 1-124, ISSN: 0000-0003.

* cited by examiner

ROBUST HEADER COMPRESSION (ROHC) TECHNIQUES FOR A DYNAMICALLY CHANGING EXTENSION BIT

BACKGROUND

Field of the Disclosure

The following relates generally to wireless communications, and more specifically to robust header compression (RoHC) techniques for a dynamically changing extension bit.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may use robust header compression (RoHC) to reduce signaling overhead for packet transmissions (such as voice or video transmissions from a UE). Packets compressed by means of RoHC may use a header extension between a fixed header and payload of the packet, and the presence of the header extension may be indicated within a field of the header itself. However, due to various methods associated with detecting changes in fields within headers, a receiving device may fail to identify changes in the field indicating a header extension, particularly in cases where the header extension may be variably present in different packets of a communication session. As a result, improved methods for managing dynamically changing header extension fields are desired.

SUMMARY

The described techniques relate to improved methods, systems, devices, or apparatuses that support robust header compression (RoHC) techniques to efficiently manage a dynamically changing extension bit in packet transmissions. Generally, the described techniques provide for the use of different RoHC schemes when a change in a header extension flag between packets of a communication session is determined. For example, a transmitting device (e.g., a user equipment (UE)) may determine that a value of a header extension flag in a packet has changed with respect to header extension flags in preceding packets of a communication session.

Upon detecting the change in the header extension flag, the UE may compress the header using different RoHC schemes to enable a receiving device (e.g., a base station) to efficiently process received packets that have an updated header extension. For instance, the UE may compress the header by reverting to an initialization and refresh (IR) state, where the packets transmitted in the IR state may enable a receiving device to update a compression context. Additionally or alternatively, the UE may compress the header using a compression profile that refrains from compressing a certain portion of the header (e.g., a Real-Time Transport Protocol (RTP) portion). The UE may then transmit the packet with the compressed header to the receiving device during the communication session. In some cases, the RoHC scheme used for compressing the header may be based on how frequently the value of the extension flag changes between different packets.

A method of wireless communications at a UE is described. The method may include participating in a communication session that includes transmission of packets having a header with a header extension flag, determining that a value of the header extension flag in a packet has changed with respect to a value of the header extension flag in one or more previous packets of the communication session, compressing the header of the packet according to an RoHC scheme based at least in part on determining that the value of the header extension flag in the packet has changed, and transmitting the packet comprising the compressed header.

An apparatus for wireless communications at a UE is described. The apparatus may include means for participating in a communication session that includes transmission of packets having a header with a header extension flag, means for determining that a value of the header extension flag in a packet has changed with respect to a value of the header extension flag in one or more previous packets of the communication session, means for compressing the header of the packet according to an RoHC scheme based at least in part on determining that the value of the header extension flag in the packet has changed, and means for transmitting the packet comprising the compressed header.

Another apparatus for wireless communications at a UE is described. The apparatus may include a processor, memory in electronic communication with the processor, and instructions stored in the memory. The instructions may be operable to cause the processor to participate in a communication session that includes transmission of packets having a header with a header extension flag, determine that a value of the header extension flag in a packet has changed with respect to a value of the header extension flag in one or more previous packets of the communication session, compress the header of the packet according to an RoHC scheme based at least in part on determining that the value of the header extension flag in the packet has changed, and transmit the packet comprising the compressed header.

A non-transitory computer readable medium for wireless communications at a UE is described. The non-transitory computer-readable medium may include instructions operable to cause a processor to participate in a communication session that includes transmission of packets having a header with a header extension flag, determine that a value of the header extension flag in a packet has changed with respect to a value of the header extension flag in one or more previous packets of the communication session, compress the header of the packet according to an RoHC scheme based at least in part on determining that the value of the header extension flag in the packet has changed, and transmit the packet comprising the compressed header.

In some examples of the method, apparatus, and non-transitory computer-readable medium described above, compressing the header of the packet according to the RoHC scheme comprises: selecting the RoHC scheme based at least in part on a frequency of change of the header extension flag. In some examples of the method, apparatus, and non-transitory computer-readable medium described above, compressing the header of the packet according to the RoHC scheme comprises: reverting the UE to an IR state. Some examples of the method, apparatus, and non-transitory computer-readable medium described above may further include processes, features, means, or instructions for compressing the header of the packet based at least in part on the UE being in the IR state. In some examples of the method, apparatus, and non-transitory computer-readable medium described above, compressing the header of the packet according to the RoHC scheme comprises: compressing the header using a compression profile that does not include compression of an RTP portion of the header.

In some examples of the method, apparatus, and non-transitory computer-readable medium described above, the compression profile comprises a User Datagram Protocol (UDP) compression profile. In some examples of the method, apparatus, and non-transitory computer-readable medium described above, compressing the header of the packet according to the RoHC scheme comprises: switching from an RTP compression profile to a User Datagram Protocol (UDP) compression profile. In some examples of the method, apparatus, and non-transitory computer-readable medium described above, compressing the header of the packet according to the RoHC scheme comprises: configuring the packet as an IR packet or an initialization and refresh, dynamic part (IR-DYN) packet comprising the compressed header, wherein the transmitted packet comprises the IR packet or the IR-DYN packet.

Some examples of the method, apparatus, and non-transitory computer-readable medium described above may further include processes, features, means, or instructions for determining a channel error rate associated with transmitting the packet. Some examples of the method, apparatus, and non-transitory computer-readable medium described above may further include processes, features, means, or instructions for transmitting one or more repetitions of the packet based on the determined channel error rate.

In some examples of the method, apparatus, and non-transitory computer-readable medium described above, transmitting the one or more repetitions of the packet comprises: identifying a threshold number of transmitted packets based on the determined channel error rate. Some examples of the method, apparatus, and non-transitory computer-readable medium described above may further include processes, features, means, or instructions for transmitting the one or more repetitions of the packet until the threshold number of transmitted packets may be satisfied.

In some examples of the method, apparatus, and non-transitory computer-readable medium described above, transmitting the one or more repetitions of the packet comprises: transmitting the one or more repetitions of the packet until an acknowledgment message may be received from a receiving device. Some examples of the method, apparatus, and non-transitory computer-readable medium described above may further include processes, features, means, or instructions for transmitting one or more repetitions of the packet until a receiving device acknowledges that the receiving device may have updated an RoHC context based at least in part on the transmitted packet.

Some examples of the method, apparatus, and non-transitory computer-readable medium described above may further include processes, features, means, or instructions for remaining in an IR state until the UE determines that the receiving device may have updated an RoHC context based at least in part on the transmitted packet. In some examples of the method, apparatus, and non-transitory computer-readable medium described above, the packet comprises a media data packet, the media data packet comprising at least video data or voice data.

DETAILED DESCRIPTION

Figure 1:
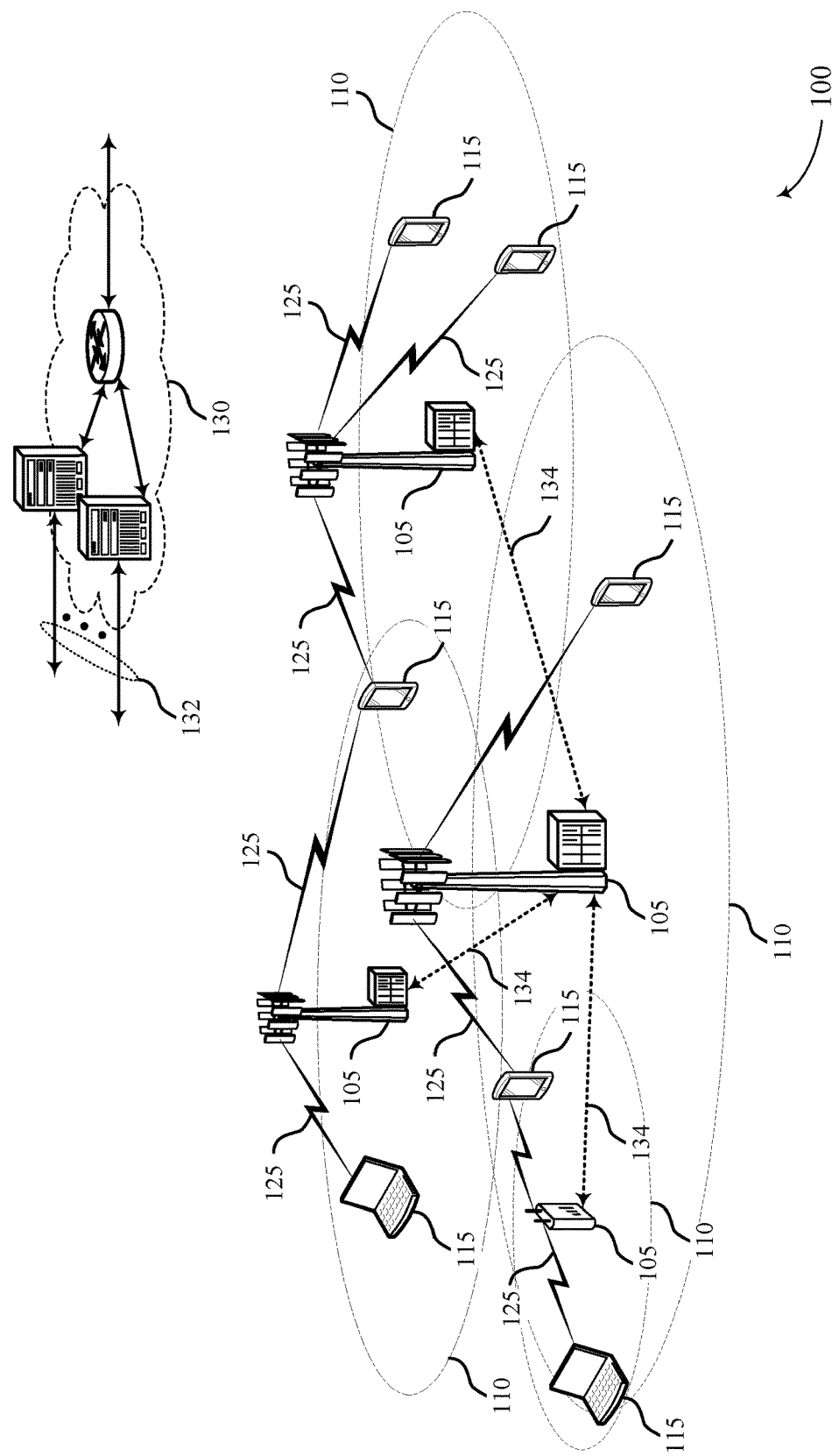
FIG. 1 illustrates an example of a system for wireless communications that supports robust header compression (RoHC) techniques for a dynamically changing extension bit in accordance with aspects of the present disclosure.

A wireless communications system may use robust header compression (RoHC) to reduce signaling overhead during packet transmissions. For example, packets may be carried via certain protocols (e.g., Internet Protocol (IP), Real-time Transport Protocol (RTP), User Datagram Protocol (UDP), etc.), and RTP/UDP/IP packets may sometimes have relatively large headers compared to the data payload. To improve bandwidth utilization, the header may accordingly be compressed via RoHC.

RoHC may use headers that include a static section and a dynamic section. The static section may include information that, in some cases, may not change between adjacent packets during transmission (e.g., IP address, port number, etc.). The dynamic section may include information that changes for each packet (e.g., sequence number, timestamp, etc.). In an initialization and refresh (IR) state, a compressor at a transmitting device (e.g., a user equipment (UE)) may transmit, to a decompressor of a receiving device (e.g., a base station), a header including both the static and dynamic sections, but subsequent transmissions may include only the dynamic section.

The static and dynamic sections of the header may each include an extension bit (e.g., an RTP extension bit) that indicates the presence of an extended header in the packet. Inclusion of the extension bit in the static section of the header may be interpreted to indicate an extended header setting for an entire communication session, while inclusion of the extension bit in the dynamic section of the header may be interpreted to indicate that an extended header setting has changed during a communication session (e.g., between subsequent packets). Because the extension bit may be included in the static section of the header, a receiving device may not recognize an updated extension bit value within the dynamic section of the header, assuming the value to be unchanging. As a result, changes in the extension bit may not be known when a received packet is decompressed, leading to a failed cyclic redundancy check (CRC), which may accordingly affect communications between the devices.

In some cases, methods for efficiently handling a dynamically changing extension bit may be used to avoid communications issues related to header compression. That is, a UE may determine that an extension bit value has changed between packets of a communication session and use different RoHC techniques to ensure a receiving device is aware of the updated header extension value. For example, upon identifying the change in the extension bit value, the UE may revert to an IR state to transmit an IR or IR, dynamic part (IR-DYN) packet including a header with the updated extension bit. In such cases, the transmission of the IR (or IR-DYN) packet may enable a receiving device to identify the updated extension bit value, update a compression context for received packets, and avoid CRC failures when decompressing the received packets. Additionally or alternatively, upon the determination of the change in the state of the extension bit, the UE may switch from a first profile (e.g., an RTP profile) to a second profile that refrains from compressing an RTP portion of the header (e.g., a UDP profile). In such cases, an RTP header may not be compressed, and a receiving device may not encounter any CRC failures upon decompressing the received packet.

Aspects of the disclosure are initially described in the context of a wireless communications system. Examples are then described for using different RoHC schemes for the compression of a header when a change in a value of a header extension flag is determined. Aspects of the disclosure are further illustrated by and described with reference to apparatus diagrams, system diagrams, and flowcharts that relate to RoHC techniques for a dynamically changing extension bit.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may enable the efficient detection of changing header extension flags through the use of different RoHC compression schemes.

Base stations 105 may wirelessly communicate with UEs 115 (e.g., using various radio access technologies (RATs) or wireless technologies) via one or more base station antennas. Each base station 105 may provide communication coverage for a respective geographic coverage area 110. Each base station 105 may provide communication coverage for a macro cell, a small cell, or other types of cell. The term "cell" is a 3rd Generation Partnership Project "3GPP" term that can be used to describe a base station, a carrier or component carrier associated with a base station, or a coverage area (e.g., sector, etc.) of a carrier or base station 105, depending on context.

Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. A base station 105 may also be referred to as an access point ("AP"), a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RB S"), or some other terminology.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS). The core network 130 may provide user authentication, access authorization, tracking, IP connectivity, and other access, routing, or mobility functions.

Some UEs 115 may transmit and receive voice and/or video packets in wireless communications system 100. For instance, a UE 115 may participate in voice over IP (VoIP) or voice over LTE (VoLTE) communications with another UE 115. In some cases, the voice and/or video data packets may be transmitted using over the top (OTT) clients (e.g., Skype), where media data packets are transmitted over a network connection for VoIP services. In some cases, voice and/or video packets may be associated with a relatively smaller payload as compared to the header, and may accordingly use header compression techniques (e.g., RoHC) to reduce overhead.

In some cases, data packets of a communication session or data flow may be carried via certain protocols, including, for example, IP, RTP, and UDP. An IP/UDP/RTP header carried in the data packets may include one or more fields for bits representing different values, where the fields may be classified according to their properties. The fields may be categorized into classes including, for example, "INFERRED," "STATIC," "STATIC-DEF," "STATIC-KNOWN," and "CHANGING." Fields classified as "INFERRED" may contain values that can be inferred from other values in the header (e.g., the size of the frame carrying the data packet), and thus may not be handled by the compression scheme. Fields classified as "STATIC" may be expected to be constant throughout the lifetime of the packet stream, and thus may be communicated at least once in for data flow. Fields classified as "STATIC-DEF" may define a packet stream, and may be handled similarly to "STATIC" fields. Fields classified as "STATIC-KNOWN" may have well-known values, such that they may not be transmitted at all. Fields classified as "CHANGING" may be expected to vary in some way, for example, randomly, within a limited value set or range.

As discussed above, headers of the data packets in the data flow may be compressed to reduce overhead during transmission. To establish a compressed data flow of data packets between UE 115 and base station 105, UE 115 and base station 105 may first establish a context for the data flow. The context may include information from previous headers in data flow, such as static fields and reference values for compression and decompression. The context may further include information indicating the change behavior of dynamic values, such as, for example, an inter-packet increase in sequence number or timestamps.

A context identifier (CID) associated with the data compression scheme may be included in the header of a data packet to identify the context. A value may be associated with the CID, where the value may identify a state to be maintained by a corresponding compressor of the UE and decompressor of the base station 105 to compress and decompress, respectively, the data contained in the data flow. The CID may be created and transmitted during an IR state when, for example, the CID has a value greater than zero. Alternatively, the UE may not transmit a CID, in which case an implied value may be associated with the CID, for example, an implied value of zero.

Wireless communications system 100 may enable the use of different RoHC schemes when a change in a header extension flag between packets of a communication session is determined. For example, a UE 115 may determine that a value of a header extension flag in a packet has changed with respect to header extension flags in preceding packets of a communication session. Upon detecting the change in the header extension flag, the UE 115 may compress the header using different RoHC schemes to enable a receiving device (e.g., a base station 105 or another UE 115) to efficiently process received packets that have an updated header extension. For instance, the UE 115 may compress the header by reverting to an IR state, where the packets transmitted in the IR state may enable a receiving device to update a compression context. Additionally or alternatively, the UE 115 may compress the header using a compression profile that refrains from compressing a certain portion of the header (e.g., a RTP portion). The UE 115 may then transmit the packet with the compressed header to the receiving device during the communication session. In some cases, the RoHC scheme used for compressing the header may be based on how frequently the value of the extension flag changes between different packets.

Figure 2:
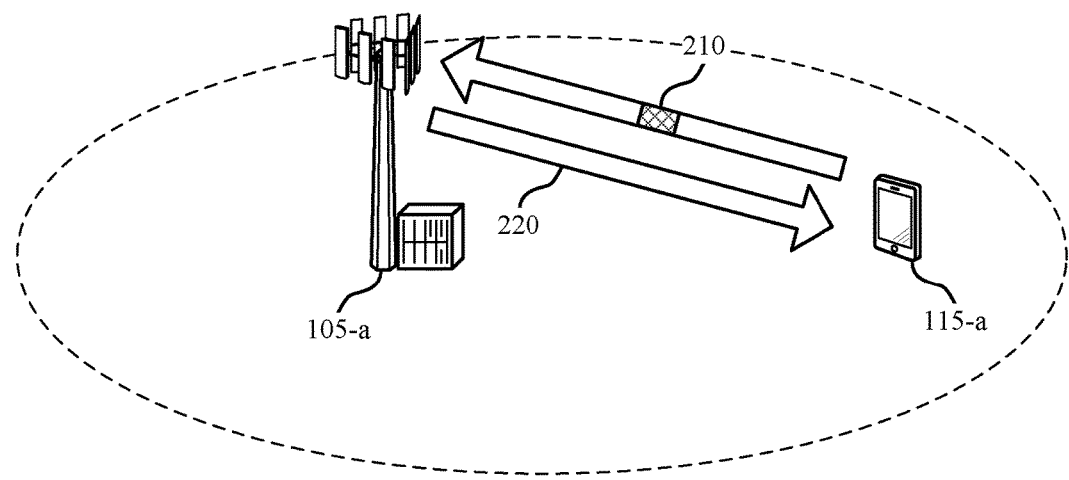
FIG. 2 illustrates an example of a wireless communications system that supports RoHC techniques for a dynamically changing extension bit in accordance with aspects of the present disclosure.

FIG. 2 illustrates an example of a wireless communications system 200 that supports compression schemes that account for a changing extension bit in accordance with aspects of the present disclosure. Wireless communications system 200 may include UE 115-a and a receiving device, shown as base station 105-a. With reference to all figures and the specification, the receiving device is depicted and described as a base station 105, but may alternatively be any device capable of performing the described functions of a receiving device. For example, the receiving device may alternatively be another UE 115.

Packets 210 transmitted by UE 115-a (e.g., data packets transmitted according to RTP, UDP, and/or IP) may have relatively large headers compared to the data payload. To improve bandwidth utilization, wireless communications system 200 may utilize a data compression scheme to compress these headers for a compressed data flow for transmissions between UE 115-a and base station 105-a, which may reduce signaling overhead during transmissions of packets 210. The data compression scheme may be, for example, an RoHC scheme.

In the RoHC scheme, UE 115-a and base station 105-a (i.e., a compressor and a decompressor) may operate according to, and transition between, different modes of operation. For example, in a unidirectional mode (U-mode), packets 210 may be sent in one direction from the compressor to the decompressor. Alternatively, in a bidirectional optimistic mode (O-mode) the compressor may send transmissions as in the U-mode, but the O-mode may additionally include feedback channel 220 for error recovery requests and acknowledgements from the decompressor to the compressor. As a further alternative, in a bidirectional reliable mode (R-mode), the feedback channel 220 may be used more frequently to further avoid packet loss due to context invalidation. A compressor and decompressor operating according to the RoHC scheme may begin in the U-mode. However, when operating with a usable return channel, the compressor and decompressor may wish to operate according to a bidirectional mode, such as the O-mode. The compressor and decompressor may transition from the U-mode to the bidirectional mode based on the compressor receiving feedback from the decompressor, where the feedback may be protected by a CRC. Upon receiving feedback from the decompressor with a correct CRC, the compressor may then switch to the indicated bidirectional mode (e.g., the O-mode).

As further discussed below, a header compressed according to the RoHC scheme may include a static section, which base station 105-*a* may check upon receipt of an initial data packet, and a dynamic section, which base station 105-*a* may check upon receipt of each subsequent data packet. The static and dynamic sections of the header may include an extension bit (e.g., an RTP extension bit), which may indicate an extended header in packet 210. However, because the extension bit may be included in the static section of the header, base station 105-*a* may not check for an updated extension bit value within the dynamic section of the header. That is, base station 105-*a* may have already assumed that the value of the extension bit is static, because, for example, the extension bit field has a static classification. As a result, changes in the extension bit may not be recognized, leading to a failed CRC and further communication errors and delays, such as a complete mute in a voice transmission. As a result, an inactivity timer (e.g., an RTP inactivity timer) set to a certain value (e.g., 20 s) may expire at a mobile terminating UE 115, at which point the UE 115 may release the data flow using session initiation protocol (SIP) signaling.

Thus, a method for efficiently handling a dynamically changing extension bit is desirable. For example, UE 115-*a* may establish a data flow with base station 105-*a* to transmit real-time media data, such as voice or video data, and UE 115-*a* may use RoHC to compress the headers of packets 210 for the data. In such cases, UE 115-*a* may transmit to base station 105-*a* an IR or IR-DYN packet 210 with a header containing extension bits or an extension flag that indicate that an extended header is, for example, not used. In a subsequent packet 210, UE 115-*a* may determine that the extension bit of packet 210 has changed to a value corresponding to the use of an extended header. To communicate the change to base station 105-*a*, UE 115-*a* may revert to an IR state to reestablish the value for the extension bit for each change in the value of the extension bit. Alternatively, UE 115-*a* may switch to a different profile that may leave the RTP portion of the header (including any extended header) uncompressed, so that base station 105-*a* may avoid encountering any inconsistency between a CRC value and its corresponding compressed portion.

Figure 3:
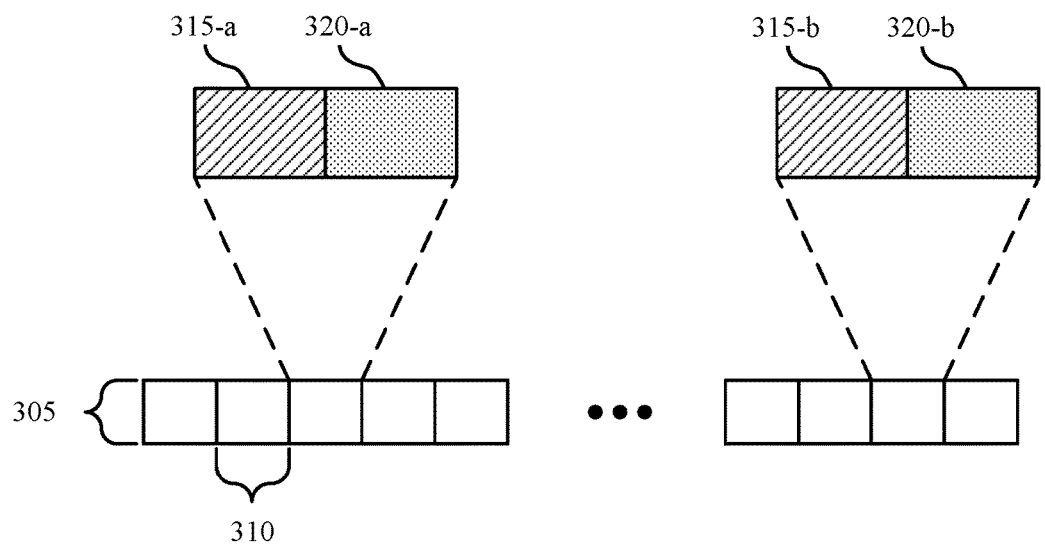
FIG. 3 illustrates an example of a communication session in a system that supports RoHC techniques for a dynamically changing extension bit in accordance with aspects of the present disclosure.

FIG. 3 illustrates an example of a communication session 300 in a system that supports RoHC techniques for a dynamically changing extension bit in accordance with aspects of the present disclosure. For example, communication session 300 may be an example a transmission of voice or video packets from a transmitting device (e.g., a mobile originating UE 115) to a receiving device (e.g., mobile terminating UE 115, where the packets are routed through one or more base stations 105). In some examples, communication session 300 may utilize the RoHC scheme for compressed transmissions between a UE 115 and a base station 105, where the compressed transmissions may include an extension bit indicating an extended header, and where the value of the extension bit may change.

Communication session 300 may include one or more data flows 305. In some cases, data flow 305 may be identified by a CID, and data flow 315 may be, for example, a single direction voice transmission. Data flow 305 may include multiple packets 310 (e.g., data packets). Packets 310 may be identified and grouped together into corresponding data flows 305. This may maximize packet-to-packet redundancy to improve the compression ratio. Accordingly, each packet 310 may include a header 315 and a payload 320.

Packets 310 compressed using RoHC may include headers 315 that have a static section and a dynamic section. The static section of the header 315 may include static IP/UDP/RTP data that does not change between adjacent packets 310 during data flow 305, such as values for the fields classified as "STATIC" (e.g., IP address, UDP port number, RTP synchronization source identifier, etc.). The dynamic section may include data that changes between each packet 310 during data flow 305, for example, values for the fields classified as "CHANGING" (e.g., for an RTP profile: UDP length, RTP sequence number, timestamp, etc.). During initialization of the context, a UE 115 may transmit to a base station 105 a header 315 including the static and dynamic sections in an IR or IR-DYN packet 310. The UE 115 or the base station 105 may associate the static data and the current state of the dynamic data with a CID. Subsequent transmissions from the UE 115 to the base station 105 may include only the dynamic section.

In some cases, the static or dynamic section of the header 315 may include an extension bit (e.g., an RTP extension bit), which may indicate the use of a header extension. For instance, an extension bit having a value of one may indicate that a header extension is present, where an extension bit with a value of zero may indicate that there is no header extension. In communication session 300, a first header 315-*a* may be an example of an extended header in a packet 310 transmitted by the UE 115. First header 315-*a* may be used, for example, when a CID and a portion of packet 310 to which the CID is to be applied have not been pre-negotiated, or when different compression contexts are to be applied to different portions of the transmitted packet 310.

Illustratively, the value of an extension bit may change within a transmission, for example, during video telephony to account for a change of video orientation, or during a voice transmission to provide additional information during the voice transmission, such as a GPS timestamp after an interval of time. When accounting for a change in video orientation, a UE 115 may, for example, first compensate for a rotation, then compensate for a flip of the video transmission. When operating for multimedia telephony service (e.g., a multimedia telephone service for IP multimedia subsystem (IMS) (MTSI) client) the UE 115 may use first header 315-*a* and add payload bytes to the last packet 310 (e.g., a last RTP packet) in each group of packets 310 that make up a particular frame (e.g., an intra-coded frame (I-frame) or an instantaneous decoder refresh (IDR) frame for the H.264 (or, MPEG-4 Part 10, Advanced Video Coding (AVC)) video compression standard, or an intra-random access point (IRAP) picture for the H.265 (or, High Efficiency Video Coding (HEVC)) video compression standard).

Additionally or alternatively, a UE 115 may add payload bytes onto packet 310 in one or more groups of packets 310 that make up another type of frame (e.g., a predictive coded frame (P-frame) for H.264/AVC) if their current value is different than the value previously transmitted. Thus, if, for example, this provides the only extension of first header 315-*a*, eight bytes may be appended to first header 315-*a*, and the last packet 310 in the sequence of packets 310 may be indicated with a marker bit and an extension bit.

Because an extension bit may be included in the static or dynamic section of a header 315, a decompressor at a base station 105 may not detect a change of the value of the extension bit. As part of the establishment or reestablishment of data flow 315 (e.g., a voice call), a UE 115 may first transmit an IR or IR-DYN packet 310 carrying extension bit information to a base station 105 with header 315-a. The base station 105 may then decompress header 315-a and save the context, assuming that the value of the extension bit will not change.

In some cases, the UE 115 may receive data from a higher layer of a protocol stack of the UE 115 to be compressed, where the data may indicate a value for the extension bit that is different than the previously transmitted value. The UE 115 may send the new value for the extension bit in a second header 315-b of another packet 310 (e.g., a UOR-3-Ext3 packet). After determining that the value for the extension bit has changed, the UE 115 may revert to an IR state to transmit an IR or IR-DYN packet 310 including header 315-b with the updated extension bit.

In some cases, the UE may send multiple transmissions of the IR packet 310 until the UE 115 is confident that the base station 105 has updated its RoHC context. The UE 115 may be confident that the base station 105 has updated its RoHC context based on an estimated channel error rate. For example, if an estimated channel error rate is less than five percent of corrupted packets 310, sending eight IR packets 310 may be sufficient. This technique may be used, for example, if a base station 105 only supports unidirectional operation. Additionally or alternatively, the UE 115 may be confident that the base station 105 has updated its RoHC context when the UE 115 receives an acknowledgement from the base station 105. This technique may be used, for example, when the base station 105 supports bidirectional operation.

The UE 115 may then resume transmitting RoHC compressed media data until the UE 115 detects a further change in the value of the extension bit, at which point the UE 115 may revert to the IR state again and repeat the transmission of the IR packet 310. This may enable the base station 105 to identify a change of the extension bit each time it changes. In some cases, this process may be used when the extension bit changes relatively less frequently, for example, once every ten packets 310.

Additionally or alternatively, upon a change in the state of the extension bit, the UE 115 may switch from a first profile (e.g., an RTP profile) to a second profile that refrains from compressing an RTP portion of a header 315 (e.g., a UDP profile). In a UDP profile, for example, the UE 115 may compress IP and UDP portions of an RTP/UDP/IP transmission, and an RTP portion may remain uncompressed. Because the RTP portion remains uncompressed, a CRC value may not be affected by any changes in the use of (or absence of) an RTP header extension when the packet is decompressed. This process may avoid frequently switching into IR state, but the uncompressed RTP portion may occupy a greater portion of the bandwidth in each transmission. In some cases, this process may be used when the RTP extension bit changes relatively more frequently, for example, once every other packet 310.

Figure 4:
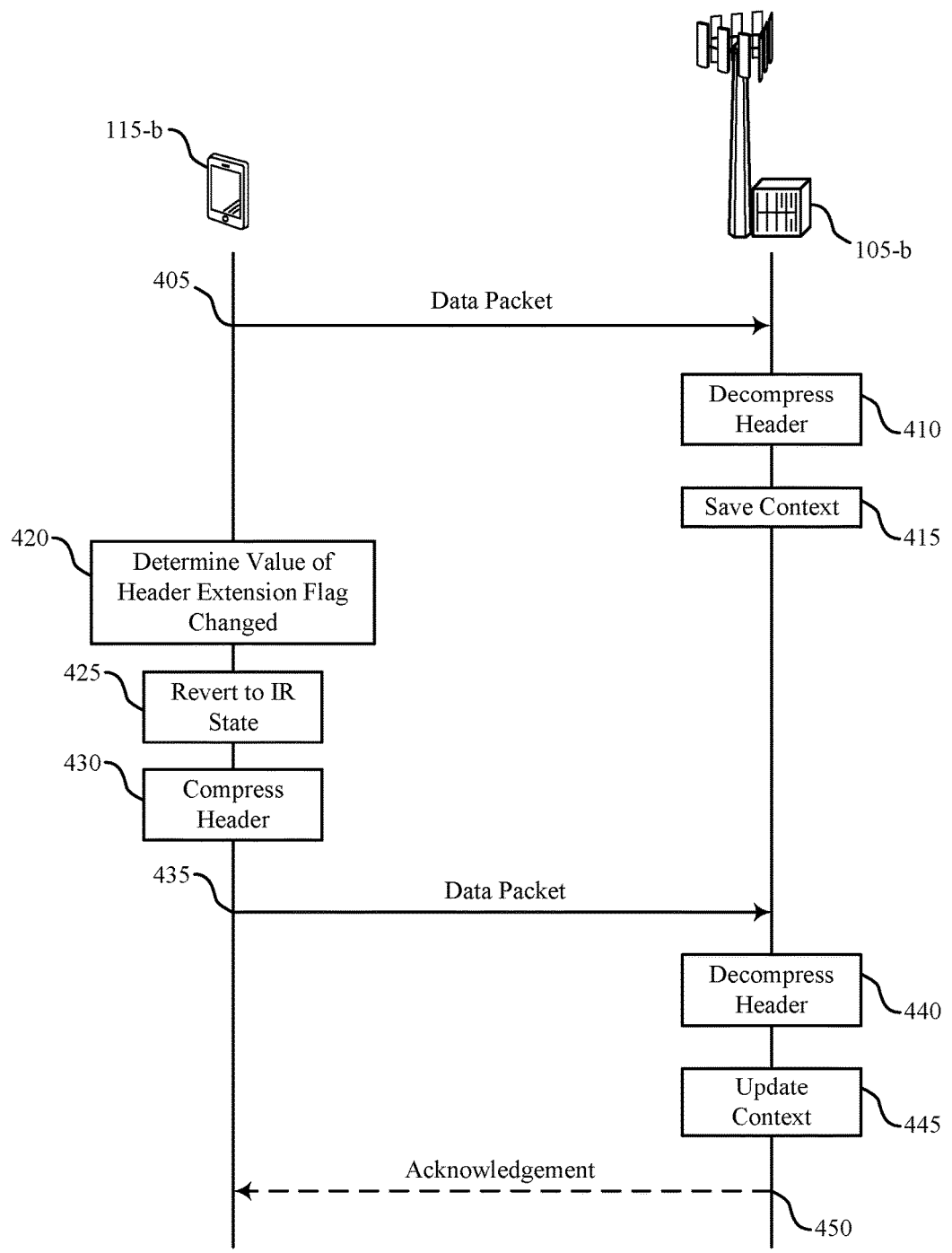
FIGS. 4 and 5 illustrate examples of process flows in a system that supports RoHC techniques for a dynamically changing extension bit in accordance with aspects of the present disclosure.

FIG. 4 illustrates an example of a process flow 400 in a system that supports an RoHC compression scheme in accordance with aspects of the present disclosure. Process flow 400 may utilize the RoHC scheme for compressed transmissions between UE 115-b and base station 105-b, where the compressed transmissions may include an extension bit indicating an extended header. In process flow 400, upon a change in the value of the extension bit, UE 115-b may revert to an IR state to communicate an updated extension bit value. In some cases, this process may be used when the extension bit changes relatively less frequently, for example, once every ten packets.

At 405, UE 115-b may be participating in a communication session with base station 105-b, and may accordingly transmit a packet to base station 105-b. The packet may be a media data packet including as a payload, for example, video data or voice data. The packet may include a compressed header containing various information including a header extension flag (e.g., an extension bit). The header extension flag may indicate an extended header, to be used, for example, when a CID and a portion of the packet to which the CID is to be applied have not been pre-negotiated, or when different compression contexts are to be applied to different portions of the transmitted packet.

At 410, base station 105-b may decompress the header included in the initial packet. At 415, base station 105-b may save an RoHC context. The RoHC context may include information from previous headers in the communication session, such as static fields and reference values for compression and decompression. The RoHC context may further include information indicating the change behavior of dynamic values, such as, for example, an inter-packet increase in sequence number or timestamps. The RoHC context may include a header extension flag, which may indicate that an extended header is being used. A CID associated with the data compression scheme may be included in the header of the packet to identify the context.

At 420, UE 115-b may determine that a value of the header extension flag in a packet has changed with respect to a value of the header extension flag in one or more previous packets of the communication session. This may indicate that the header may be an extended header when it previously was not an extended header (e.g., the value of the extension flag changes from 0 to 1), or that the header may not be an extended header when it was previously an extended header (e.g., the value of the extension flag changes from 1 to 0).

At 425, UE 115-b may revert to an IR state based on a selected RoHC scheme. UE 115-b may select the RoHC scheme based on a frequency of change of the header extension flag. For example, if the frequency of change of the header extension flag is relatively low, UE 115-b may select an RoHC scheme that compresses relatively more of the information in the header, and transmits the information in the IR state. The header may be compressed based on UE 115-b being in the IR state.

At 430, UE 115-b may compress the header of the packet according to the RoHC scheme based on determining that the value of the header extension flag in the packet has changed. In the IR state, UE 115-b may configure the packet as an IR packet or an IR-DYN packet, where the packet includes the compressed header. At 435, UE 115-b may transmit to base station 105-b, and base station 105-b may receive from UE 115-b, a packet including a compressed header. The packet may, for example, be an IR or IR-DYN packet based on UE 115-b transmitting the packet in the IR state. UE 115-b may associate a channel error rate with transmitting the packet. Based on the channel error rate, UE 115-b may determine a threshold number of repetitions of transmitted packets that may ensure that base station 105-b has accurately received the information. UE 115-b may then transmit to base station 105-b, and base station 105-b may receive from UE 115-b, the one or more repetitions of the packet until the threshold number of transmitted packets is satisfied. Additionally or alternatively, UE 115-b may transmit repetitions of the packet until receiving an acknowledgement or feedback from base station 105-*b*. UE 115-*b* may remain in the IR state until UE 115-*b* determines that base station 105-*b* has updated the RoHC context. This may be, for example, because UE 115-*b* has transmitted a sufficient number of repetitions of the transmission, or because UE 115-*b* has received an acknowledgement from base station 105-*b* that base station 105-*b* has updated its RoHC context.

At 440, base station 105-*b* may decompress the header included in the received packet. At 445, base station 105-*b* may update the RoHC context. The updated context may indicate that the header may be an extended header when it previously was not an extended header, or that the header may not be an extended header when it was previously an extended header. At 450, the base station 105-*b* may transmit to UE 115-*b*, and UE 115-*b* may receive from base station 105-*b*, an acknowledgement. The acknowledgement may indicate to UE 115-*b* that base station 105-*b* has updated the RoHC context based on the received packet. To transmit the packet, base station 105-*b* may be operating according to a bidirectional mode, for example, O-mode or R-mode.

Figure 5:
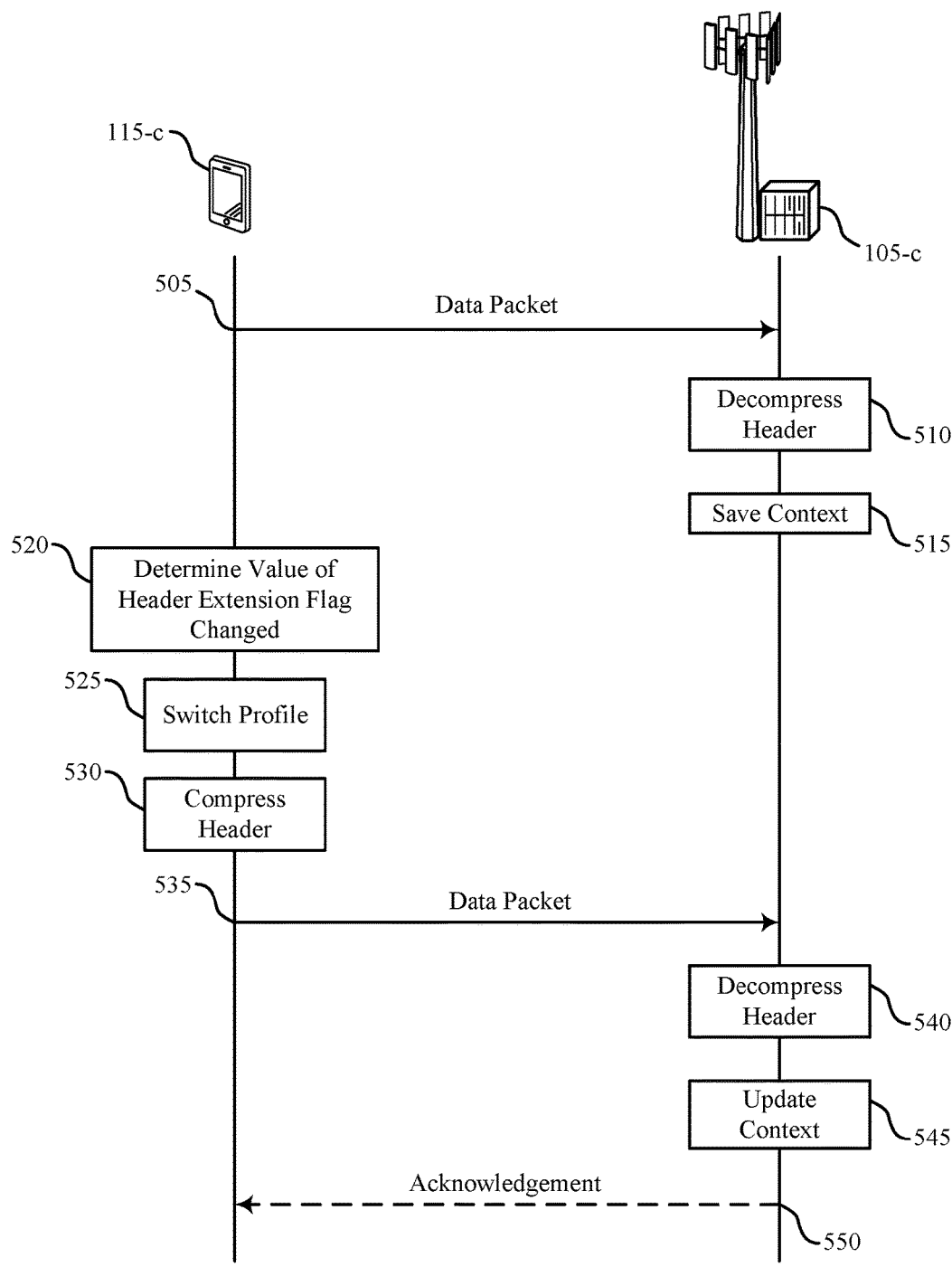

FIG. 5 illustrates an example of a process flow 500 in a system that supports an RoHC compression scheme in accordance with aspects of the present disclosure. Process flow 500 may include the use of an RoHC scheme for compressed transmissions between UE 115-*c* and base station 105-*c*, where the compressed transmissions may include an extension bit indicating an extended header. Upon a change in the value of the extension bit, UE 115-*b* may switch to a profile in which a portion of a packet is left uncompressed (e.g., an RTP header), and thus base station 105-*c* may avoid encountering CRC failures when decompressing any compressed portions of the packet. In some cases, this process may be used when the extension bit changes relatively more frequently, for example, once every other packet.

At 505, UE 115-*c* may participate in a communication session with base station 105-*c*, and may accordingly transmit a packet to base station 105-*c*. The packet may be a media data packet including video data or voice data. The packet may include a compressed header containing various information including a header extension flag (e.g., an extension bit). The header extension flag may indicate an extended header, to be used, for example, when a CID and a portion of the packet to which the CID is to be applied have not been pre-negotiated, or when different compression contexts are to be applied to different portions of the transmitted packet.

At 515, base station 105-*c* may save an RoHC context. The RoHC context may include information from previous headers in the communication session, such as static fields and reference values for compression and decompression. The RoHC context may further include information indicating the change behavior of dynamic values, such as, for example, an inter-packet increase in sequence number or timestamps. The RoHC context may include a header extension flag, which may indicate that an extended header is being used. A CID associated with the data compression scheme may be included in the header of the packet to identify the context.

At 520, UE 115-*c* may determine that a value of the header extension flag in a packet has changed with respect to a value of the header extension flag in one or more previous packets of the communication session. This may indicate that the header may be an extended header when it previously was not an extended header (e.g., the value of the extension flag changes from 0 to 1), or that the header may not be an extended header when it was previously an extended header (e.g., the value of the extension flag changes from 1 to 0).

At 525, UE 115-*c* may switch to a different compression profile based on a selected RoHC scheme. UE 115-*c* may select the RoHC scheme based on a frequency of change of the header extension flag. If, for example, the frequency of change of the header extension flag is relatively high, UE 115-*c* may switch to a compression profile that compresses relatively less of the information in the header, leaving more of the information in the header uncompressed. For example, the compression profile may be a UDP compression profile that does not compress an RTP portion of the header.

At 530, UE 115-*c* may compress the header of the packet according to an RoHC scheme based on determining that the value of the header extension flag in the packet has changed. At 535, UE 115-*c* may transmit to base station 105-*c*, and base station 105-*c* may receive from UE 115-*c*, a packet including the compressed header. At 540, base station 105-*c* may decompress the header included in the received packet, and at 545, base station 105-*c* may update the RoHC context. The updated context may indicate that the header may be an extended header when it previously was not an extended header, or that the header may not be an extended header when it was previously an extended header.

At 550, the base station 105-*c* may transmit to UE 115-*c*, and UE 115-*c* may receive from base station 105-*c*, an acknowledgement. The acknowledgement may indicate to UE 115-*c* that base station 105-*c* has updated the RoHC context based on the received packet. To transmit the packet, base station 105-*c* may be operating according to a bidirectional mode, for example, O-mode or R-mode.

Figure 6:
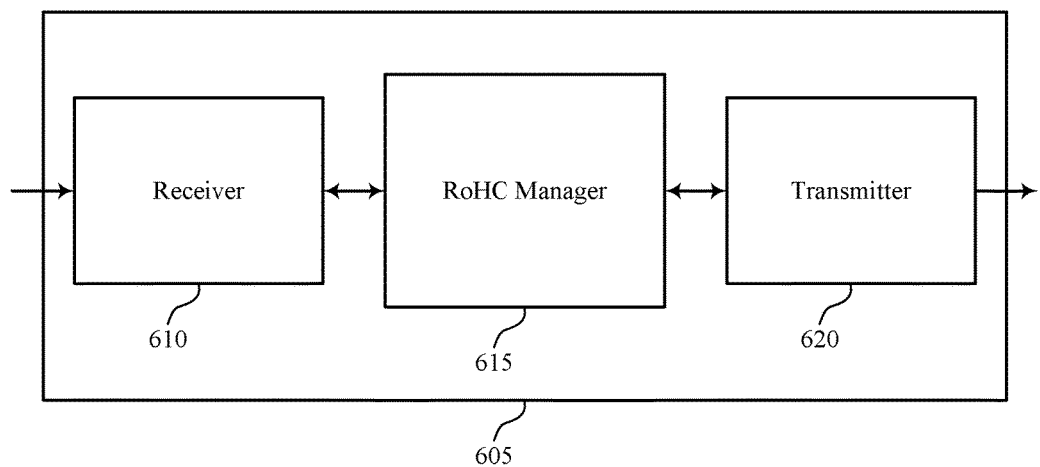
FIGS. 6 through 8 show block diagrams of a device that supports RoHC techniques for a dynamically changing extension bit in accordance with aspects of the present disclosure.

FIG. 6 shows a block diagram 600 of a wireless device 605 that supports RoHC techniques for a dynamically changing extension bit in accordance with aspects of the present disclosure. Wireless device 605 may be an example of aspects of a user equipment (UE) 115 as described with reference to FIG. 1. Wireless device 605 may include receiver 610, RoHC manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to RoHC techniques for a dynamically changing extension bit, etc.). Information may be passed on to other components of the device. The receiver 610 may be an example of aspects of the transceiver 935 described with reference to FIG. 9.

RoHC manager 615 may be an example of aspects of the RoHC manager 915 described with reference to FIG. 9. RoHC manager 615 and/or at least some of its various sub-components may be implemented in hardware, software executed by a processor, firmware, or any combination thereof. If implemented in software executed by a processor, the functions of the RoHC manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The RoHC manager 615 and/or at least some of its various sub-components may be physically located at various positions, including being distributed such that portions of functions are implemented at different physical locations by one or more physical devices. In some examples, RoHC manager 615 and/or at least some of its various sub-components may be a separate and distinct component in accordance with various aspects of the present disclosure. In other examples, RoHC manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

RoHC manager 615 may participate in a communication session that includes transmission of packets having a header with a header extension flag and determine that a value of the header extension flag in a packet has changed with respect to a value of the header extension flag in one or more previous packets of the communication session. In some cases, RoHC manager 615 may compress the header of the packet according to an RoHC scheme based on determining that the value of the header extension flag in the packet has changed and transmit the packet including the compressed header.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
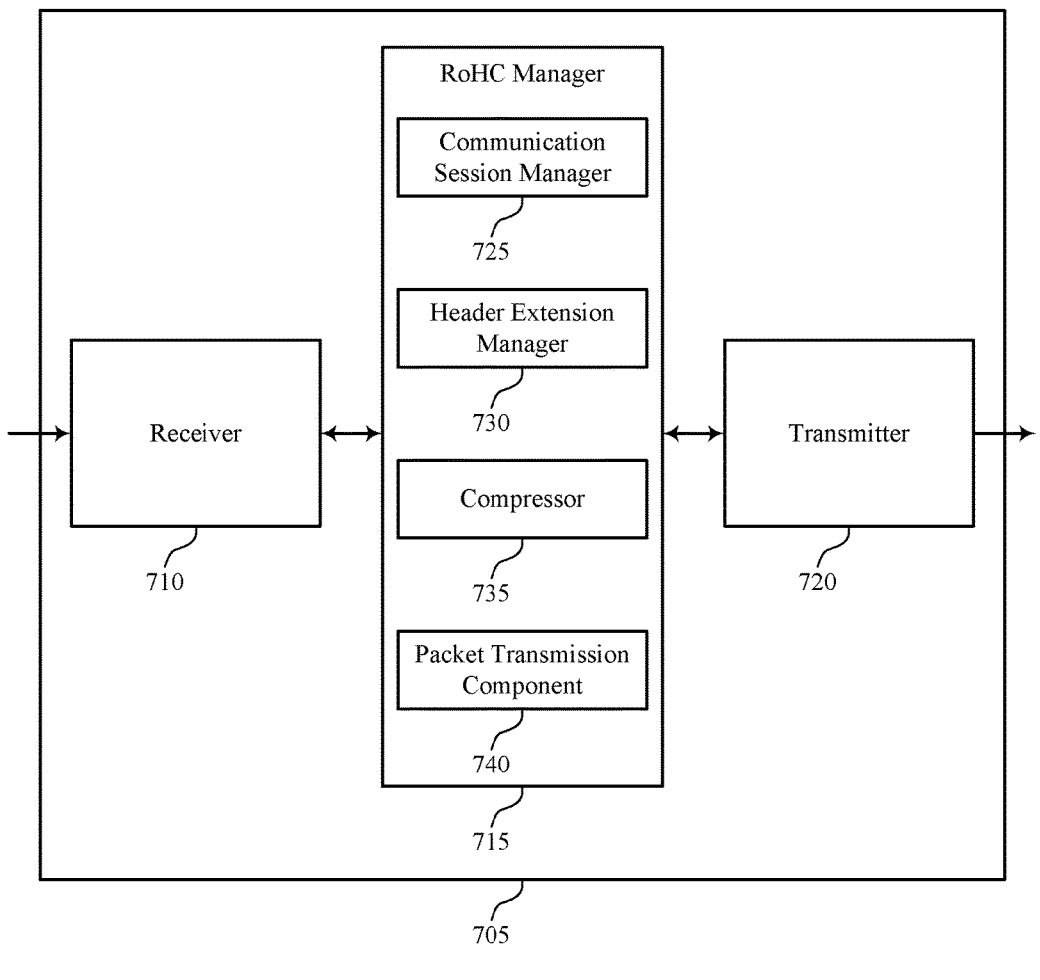

FIG. 7 shows a block diagram 700 of a wireless device 705 that supports RoHC techniques for a dynamically changing extension bit in accordance with aspects of the present disclosure. Wireless device 705 may be an example of aspects of a wireless device 605 or a UE 115 as described with reference to FIGS. 1 and 6. Wireless device 705 may include receiver 710, RoHC manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to RoHC techniques for a dynamically changing extension bit, etc.). Information may be passed on to other components of the device. The receiver 710 may be an example of aspects of the transceiver 935 described with reference to FIG. 9. RoHC manager 715 may be an example of aspects of the RoHC manager 915 described with reference to FIG. 9. RoHC manager 715 may also include communication session manager 725, header extension manager 730, compressor 735, and packet transmission component 740. Communication session manager 725 may participate in a communication session that includes transmission of packets having a header with a header extension flag. Header extension manager 730 may determine that a value of the header extension flag in a packet has changed with respect to a value of the header extension flag in one or more previous packets of the communication session.

Compressor 735 may compress the header of the packet according to an RoHC scheme based on determining that the value of the header extension flag in the packet has changed. In some examples, compressing the header of the packet according to the RoHC scheme includes selecting the RoHC scheme based on a frequency of change of the header extension flag. In some cases, compressing the header of the packet according to the RoHC scheme includes reverting the UE 115 to an IR state, and compressor 735 may compress the header of the packet based on the UE 115 being in an IR state.

Additionally or alternatively, compressing the header of the packet according to the RoHC scheme may include compressing the header using a compression profile that does not include compression of a RTP portion of the header. The compression profile may include a UDP compression profile. In some examples, compressing the header of the packet according to the RoHC scheme includes switching from an RTP compression profile to a UDP compression profile. In some cases, compressing the header of the packet according to the RoHC scheme includes configuring the packet as an IR packet or an IR-DYN packet including the compressed header.

Packet transmission component 740 may transmit the packet including the compressed header and may also transmit one or more repetitions of the packet. In some cases, packet transmission component 740 may transmit one or more repetitions of the packet based on a determined channel error rate. In some examples, transmitting the one or more repetitions of the packet may include identifying a threshold number of transmitted packets based on the determined channel error rate and transmitting the one or more repetitions of the packet until the threshold number of transmitted packets is satisfied. In some cases, transmitting the one or more repetitions of the packet includes transmitting the one or more repetitions of the packet until an acknowledgment message is received from a receiving device. In some cases, the packet includes a media data packet, where the media data packet may include at least video data or voice data. Additionally or alternatively, the transmitted packet includes the IR packet or the IR-DYN packet.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
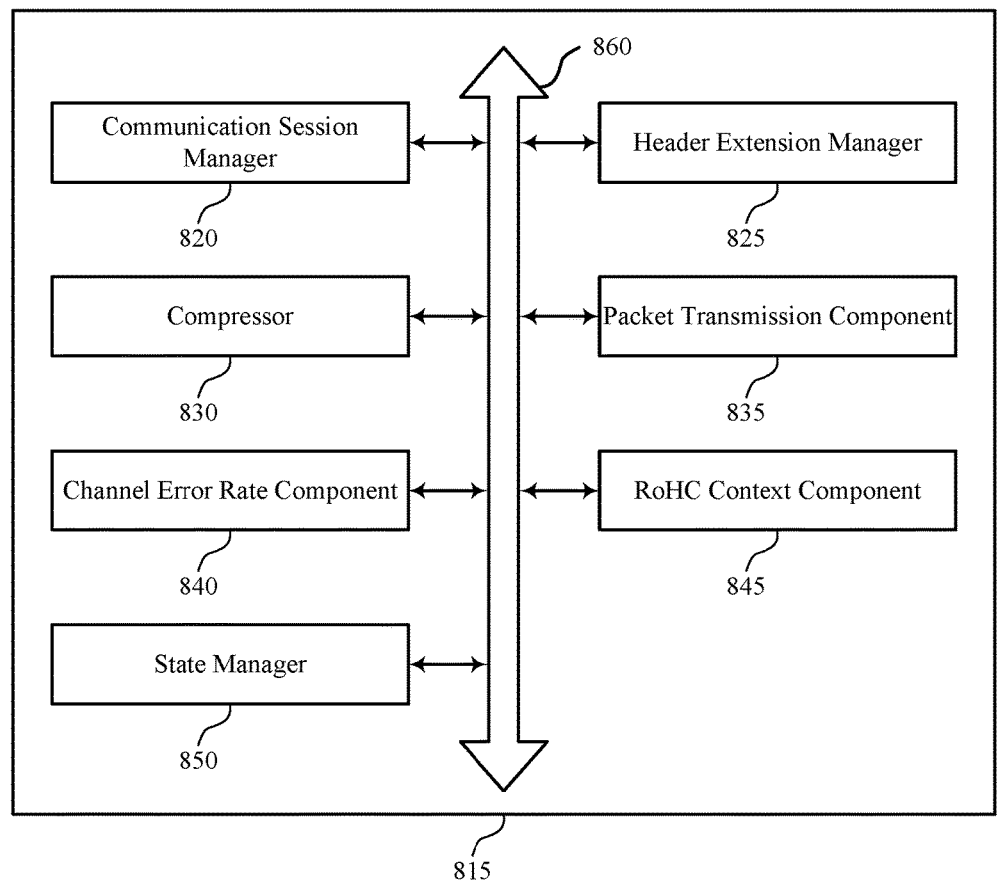

FIG. 8 shows a block diagram 800 of an RoHC manager 815 that supports RoHC techniques for a dynamically changing extension bit in accordance with aspects of the present disclosure. The RoHC manager 815 may be an example of aspects of an RoHC manager 615, an RoHC manager 715, or an RoHC manager 915 described with reference to FIGS. 6, 7, and 9. The RoHC manager 815 may include communication session manager 820, header extension manager 825, compressor 830, packet transmission component 835, channel error rate component 840, RoHC context component 845, and state manager 850. Each of these modules may communicate, directly or indirectly, with one another (e.g., via one or more buses 860).

Communication session manager 820 may participate in a communication session that includes transmission of packets having a header with a header extension flag. Header extension manager 825 may determine that a value of the header extension flag in a packet has changed with respect to a value of the header extension flag in one or more previous packets of the communication session.

Compressor 830 may compress the header of the packet according to an RoHC scheme based on determining that the value of the header extension flag in the packet has changed.

In some examples, compressing the header of the packet according to the RoHC scheme includes selecting the RoHC scheme based on a frequency of change of the header extension flag. In some cases, compressing the header of the packet according to the RoHC scheme includes reverting the UE 115 to an IR state, and compressor 830 may compress the header of the packet based on the UE 115 being in an IR state.

Additionally or alternatively, compressing the header of the packet according to the RoHC scheme may include compressing the header using a compression profile that does not include compression of a RTP portion of the header. The compression profile may include a UDP compression profile. In some examples, compressing the header of the packet according to the RoHC scheme includes switching from an RTP compression profile to a UDP compression profile. In some cases, compressing the header of the packet according to the RoHC scheme includes configuring the packet as an IR packet or an IR-DYN packet including the compressed header.

Packet transmission component 835 may transmit the packet including the compressed header and may also transmit one or more repetitions of the packet. In some cases, packet transmission component 835 may transmit one or more repetitions of the packet based on a determined channel error rate. In some examples, transmitting the one or more repetitions of the packet may include identifying a threshold number of transmitted packets based on the determined channel error rate and transmitting the one or more repetitions of the packet until the threshold number of transmitted packets is satisfied. In some cases, transmitting the one or more repetitions of the packet includes transmitting the one or more repetitions of the packet until an acknowledgment message is received from a receiving device (e.g., a base station 105). In some cases, the packet includes a media data packet, where the media data packet may include at least video data or voice data. Additionally or alternatively, the transmitted packet includes the IR packet or the IR-DYN packet.

Channel error rate component 840 may determine a channel error rate associated with transmitting the packet. RoHC context component 845 may transmit one or more repetitions of the packet until a receiving device acknowledges that the receiving device has updated an RoHC context based on the transmitted packet. State manager 850 may enable a UE 115 to remain in an IR state until the UE 115 determines that the receiving device has updated an RoHC context based on the transmitted packet.

Figure 9:
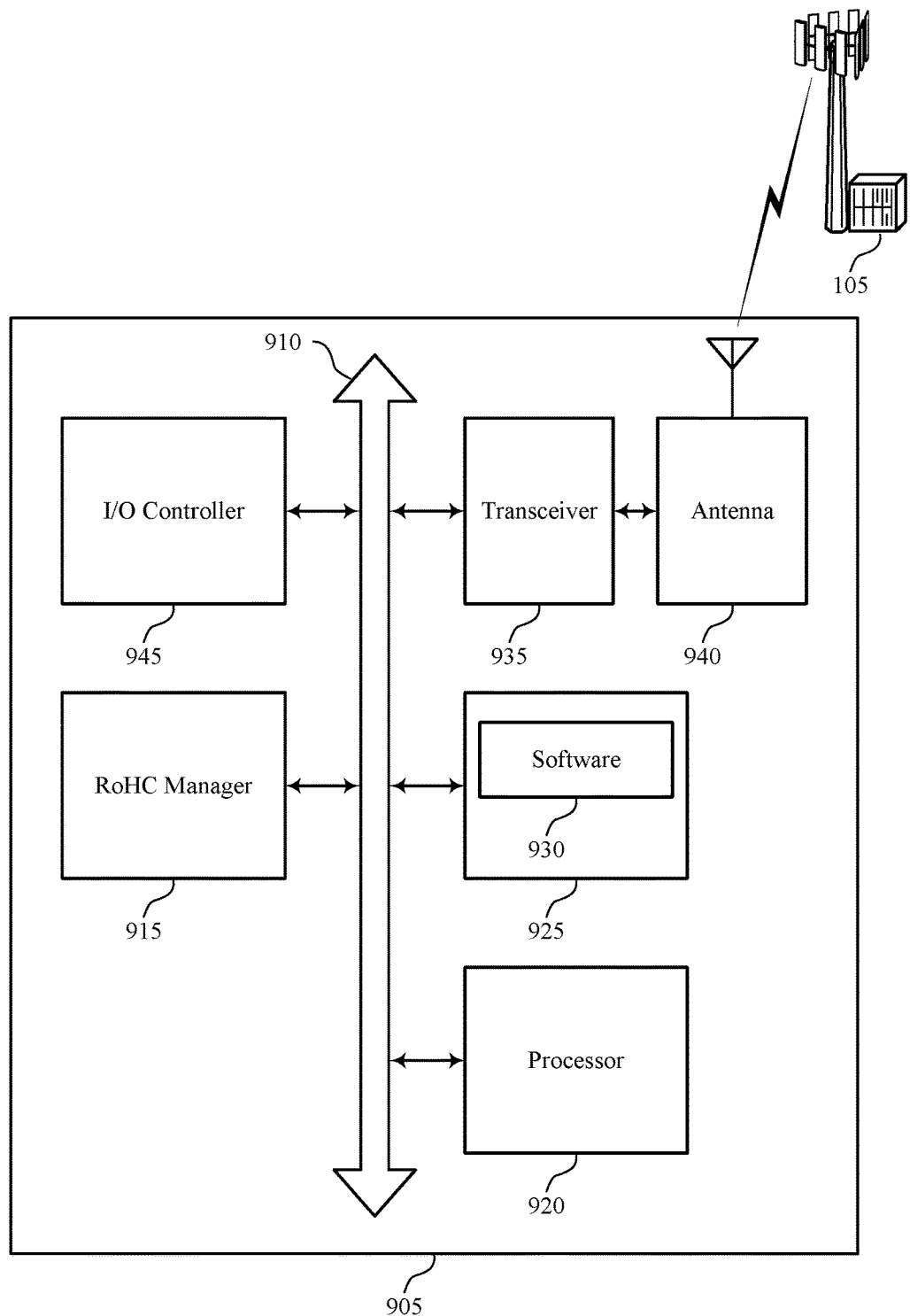
FIG. 9 illustrates a block diagram of a system including a user equipment (UE) that supports RoHC techniques for a dynamically changing extension bit in accordance with aspects of the present disclosure.

FIG. 9 shows a diagram of a system 900 including a device 905 that supports RoHC techniques for a dynamically changing extension bit in accordance with aspects of the present disclosure. Device 905 may be an example of or include the components of wireless device 605, wireless device 705, or a UE 115 as described above, e.g., with reference to FIGS. 1, 6, and 7. Device 905 may include components for bi-directional voice and data communications including components for transmitting and receiving communications, including RoHC manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting RoHC techniques for a dynamically changing extension bit).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support RoHC techniques for a dynamically changing extension bit. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
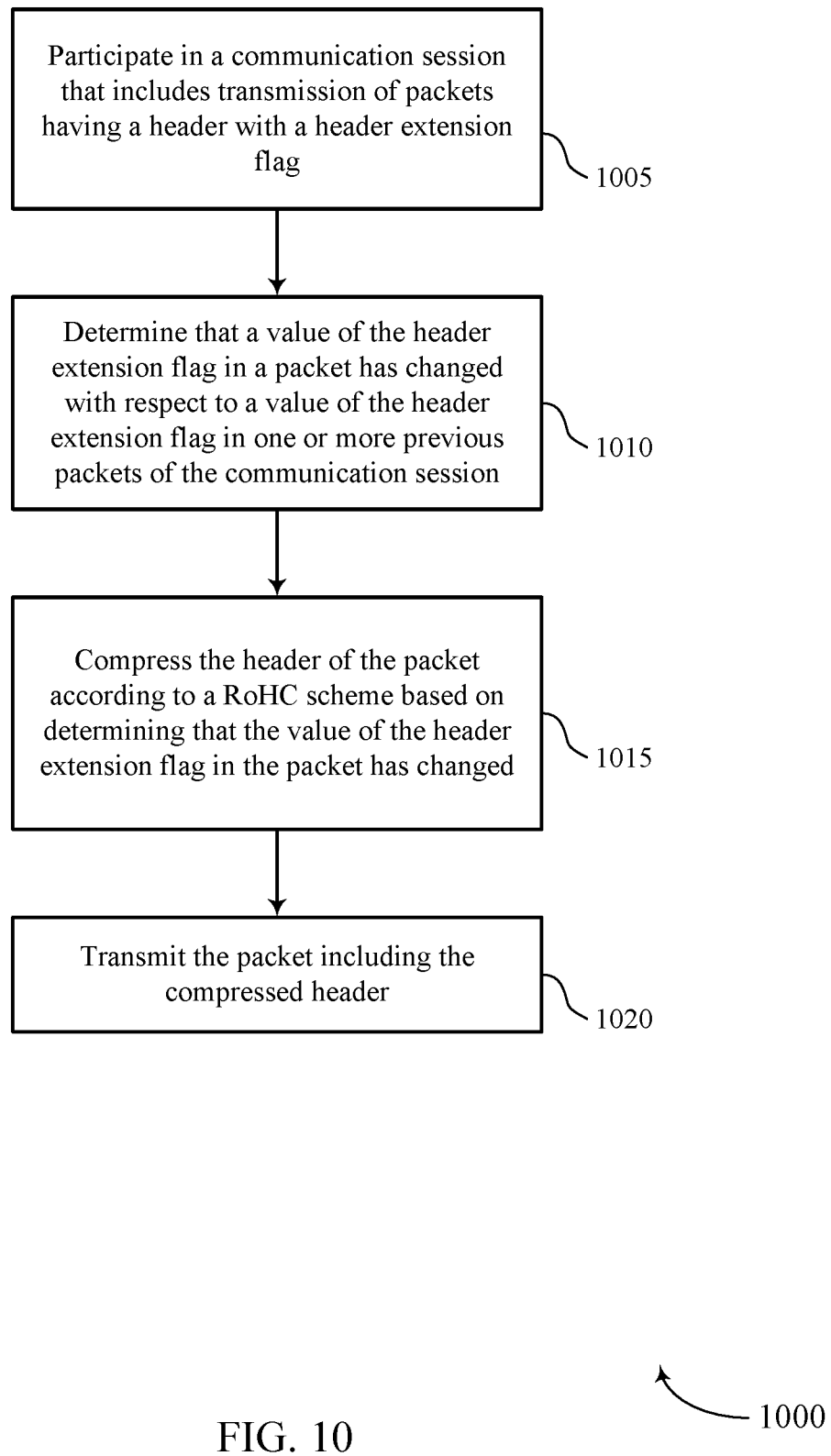
FIGS. 10 through 14 illustrate methods for RoHC techniques for a dynamically changing extension bit in accordance with aspects of the present disclosure.

FIG. 10 shows a flowchart illustrating a method 1000 for RoHC techniques for a dynamically changing extension bit in accordance with aspects of the present disclosure. The operations of method 1000 may be implemented by a transmitting device, such as a UE 115, or its components as described herein. For example, the operations of method 1000 may be performed by an RoHC manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may participate in a communication session that includes transmission of packets having a header with a header extension flag. The operations of block 1005 may be performed according to the methods described with reference to FIGS. 1 through 5. In certain examples, aspects of the operations of block 1005 may be performed by a communication session manager as described with reference to FIGS. 6 through 9.

At block 1010 the UE 115 may determine that a value of the header extension flag in a packet has changed with respect to a value of the header extension flag in one or more previous packets of the communication session. The operations of block 1010 may be performed according to the methods described with reference to FIGS. 1 through 5. In certain examples, aspects of the operations of block 1010 may be performed by a header extension manager as described with reference to FIGS. 6 through 9.

At block 1015 the UE 115 may compress the header of the packet according to an RoHC scheme based on determining that the value of the header extension flag in the packet has changed. The operations of block 1015 may be performed according to the methods described with reference to FIGS. 1 through 5. In certain examples, aspects of the operations of block 1015 may be performed by a compressor as described with reference to FIGS. 6 through 9.

At block 1020 the UE 115 may transmit the packet including the compressed header. The operations of block 1020 may be performed according to the methods described with reference to FIGS. 1 through 5. In certain examples, aspects of the operations of block 1020 may be performed by a packet transmission component as described with reference to FIGS. 6 through 9.

Figure 11:
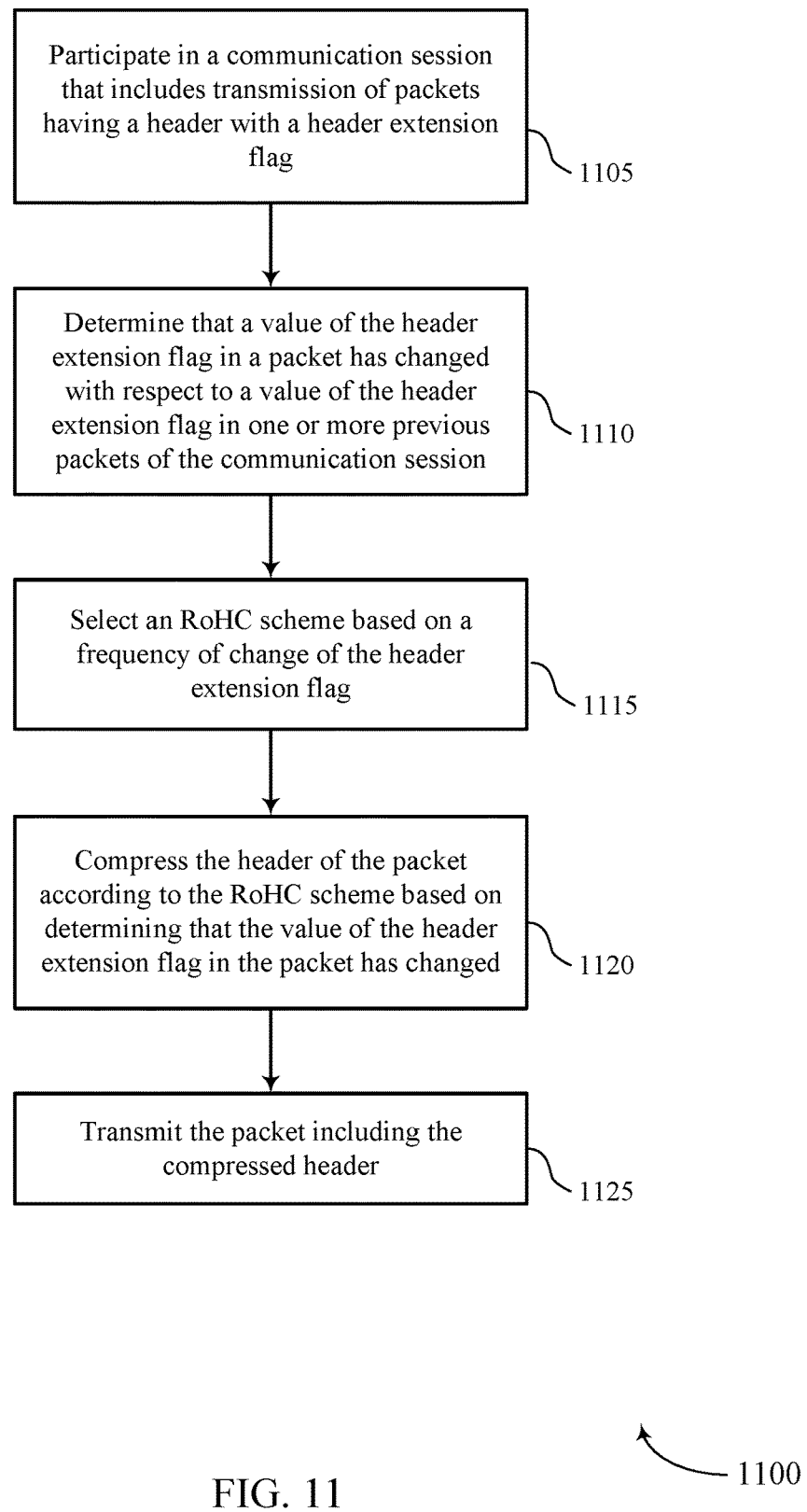

FIG. 11 shows a flowchart illustrating a method 1100 for RoHC techniques for a dynamically changing extension bit in accordance with aspects of the present disclosure. The operations of method 1100 may be implemented by transmitting device, such as a UE 115 (e.g., a mobile originating UE 115), or its components as described herein. For example, the operations of method 1100 may be performed by an RoHC manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may participate in a communication session that includes transmission of packets having a header with a header extension flag. The operations of block 1105 may be performed according to the methods described with reference to FIGS. 1 through 5. In certain examples, aspects of the operations of block 1105 may be performed by a communication session manager as described with reference to FIGS. 6 through 9.

At block 1110 the UE 115 may determine that a value of the header extension flag in a packet has changed with respect to a value of the header extension flag in one or more previous packets of the communication session. The operations of block 1110 may be performed according to the methods described with reference to FIGS. 1 through 5. In certain examples, aspects of the operations of block 1110 may be performed by a header extension manager as described with reference to FIGS. 6 through 9.

At block 1115 the UE 115 may select an RoHC scheme based on a frequency of change of the header extension flag. For example, the UE 115 may select one RoHC scheme over another if the header extension flag changes relatively more often (e.g., every other packet), which may result in a more efficient process of data compression (and decompression at the receiver) during the communication session. The operations of block 1115 may be performed according to the methods described with reference to FIGS. 1 through 5. In certain examples, aspects of the operations of block 1115 may be performed by a compressor as described with reference to FIGS. 6 through 9.

At block 1120 the UE 115 may compress the header of the packet according to the RoHC scheme based on determining that the value of the header extension flag in the packet has changed. The operations of block 1120 may be performed according to the methods described with reference to FIGS. 1 through 5. In certain examples, aspects of the operations of block 1120 may be performed by a compressor as described with reference to FIGS. 6 through 9.

At block 1125 the UE 115 may transmit the packet comprising the compressed header. The operations of block 1125 may be performed according to the methods described with reference to FIGS. 1 through 5. In certain examples, aspects of the operations of block 1125 may be performed by a packet transmission component as described with reference to FIGS. 6 through 9.

Figure 12:
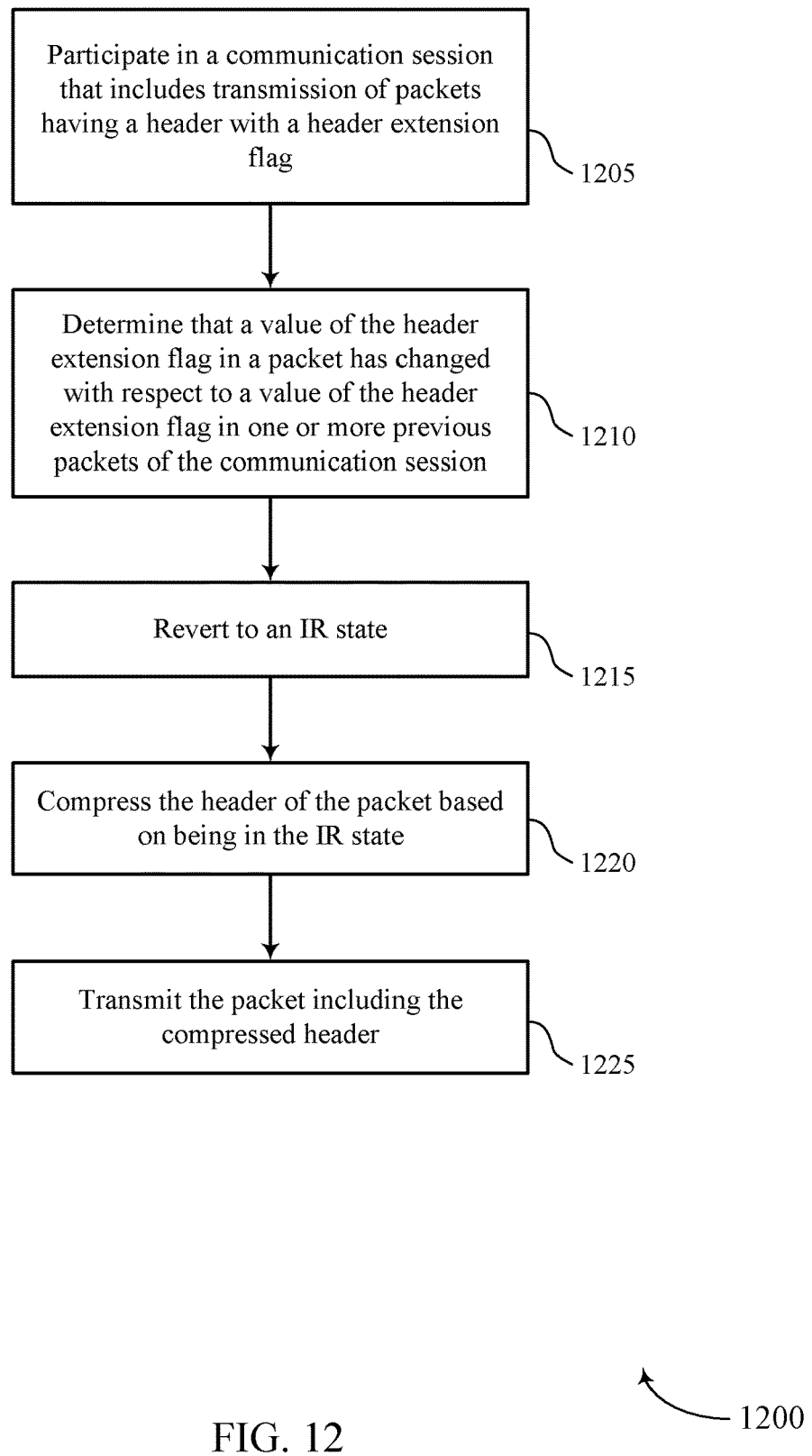

FIG. 12 shows a flowchart illustrating a method 1200 for RoHC techniques for a dynamically changing extension bit in accordance with aspects of the present disclosure. The operations of method 1200 may be implemented by a transmitting device, such as a UE 115, or its components as described herein. For example, the operations of method 1200 may be performed by an RoHC manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may participate in a communication session that includes transmission of packets having a header with a header extension flag. The operations of block 1205 may be performed according to the methods described with reference to FIGS. 1 through 5. In certain examples, aspects of the operations of block 1205 may be performed by a communication session manager as described with reference to FIGS. 6 through 9.

At block 1210 the UE 115 may determine that a value of the header extension flag in a packet has changed with respect to a value of the header extension flag in one or more previous packets of the communication session. In some examples, the UE 115 may determine that the header extension flag changes with a certain frequency (e.g., once every ten packets) during the communication session. The operations of block 1210 may be performed according to the methods described with reference to FIGS. 1 through 5. In certain examples, aspects of the operations of block 1210 may be performed by a header extension manager as described with reference to FIGS. 6 through 9.

At block 1215 the UE 115 may compress the header of the packet according to an RoHC scheme based at least in part on determining that the value of the header extension flag in the packet has changed. In some cases, compressing the header of the packet according to the RoHC scheme includes reverting the UE 115 to an IR state. The operations of block 1215 may be performed according to the methods described with reference to FIGS. 1 through 5. In certain examples, aspects of the operations of block 1215 may be performed by a compressor as described with reference to FIGS. 6 through 9.

At block 1220 the UE 115 may compress the header of the packet on the UE 115 being in the IR state. For instance, the UE 115 may configure the packet as an IR packet or an IR-DYN packet including the compressed header. The operations of block 1220 may be performed according to the methods described with reference to FIGS. 1 through 5. In certain examples, aspects of the operations of block 1220 may be performed by a compressor as described with reference to FIGS. 6 through 9.

At block 1225 the UE 115 may transmit the packet including the compressed header. The operations of block 1225 may be performed according to the methods described with reference to FIGS. 1 through 5. In certain examples, aspects of the operations of block 1225 may be performed by a packet transmission component as described with reference to FIGS. 6 through 9.

Figure 13:
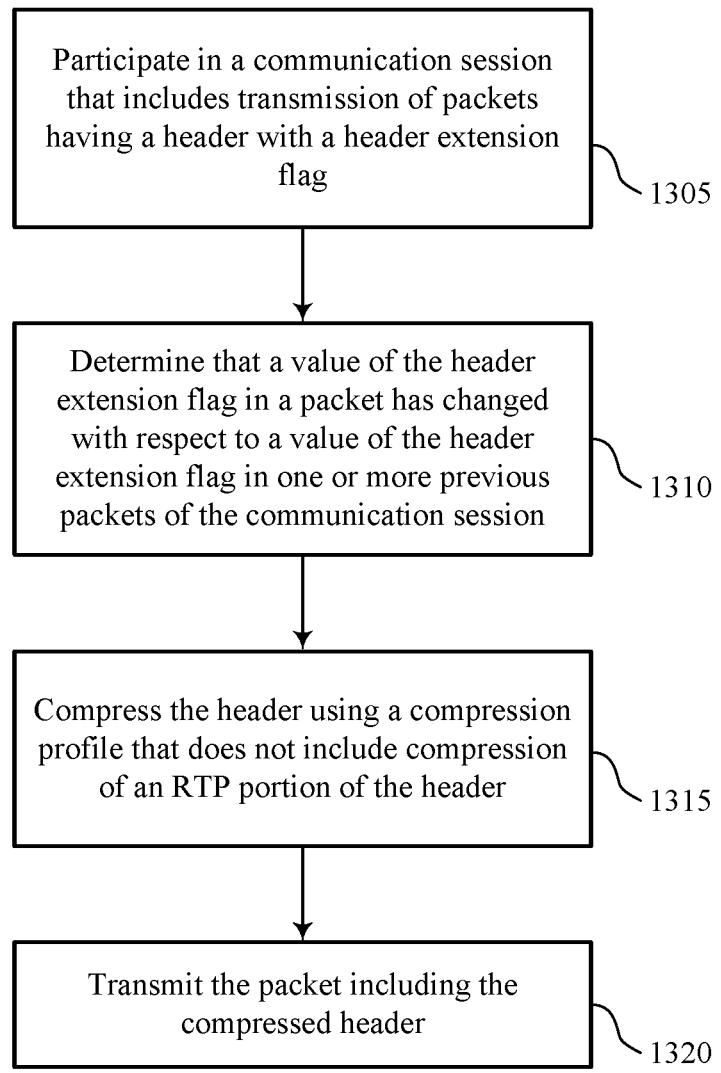

FIG. 13 shows a flowchart illustrating a method 1300 for RoHC techniques for a dynamically changing extension bit in accordance with aspects of the present disclosure. The operations of method 1300 may be implemented by a transmitting device, such as a UE 115, or its components as described herein. For example, the operations of method 1300 may be performed by an RoHC manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may participate in a communication session that includes transmission of packets having a header with a header extension flag. The operations of block 1305 may be performed according to the methods described with reference to FIGS. 1 through 5. In certain examples, aspects of the operations of block 1305 may be performed by a communication session manager as described with reference to FIGS. 6 through 9.

At block 1310 the UE 115 may determine that a value of the header extension flag in a packet has changed with respect to a value of the header extension flag in one or more previous packets of the communication session. In some examples, the UE 115 may determine that the header extension flag changes with a certain frequency (e.g., every other packet, every two packets, etc.) during the communication session. The operations of block 1310 may be performed according to the methods described with reference to FIGS. 1 through 5. In certain examples, aspects of the operations of block 1310 may be performed by a header extension manager as described with reference to FIGS. 6 through 9.

At block 1315 the UE 115 may compress the header of the packet according to an RoHC scheme based at least in part on determining that the value of the header extension flag in the packet has changed. In some cases, compressing the header of the packet according to the RoHC scheme includes compressing the header using a compression profile that does not include compression of an RTP portion of the header. For example, the compression profile may include a UDP compression profile. Additionally or alternatively, compressing the header may include switching from an RTP compression profile to the UDP compression profile. The operations of block 1315 may be performed according to the methods described with reference to FIGS. 1 through 5. In certain examples, aspects of the operations of block 1315 may be performed by a compressor as described with reference to FIGS. 6 through 9.

At block 1320 the UE 115 may transmit the packet comprising the compressed header. The operations of block 1320 may be performed according to the methods described with reference to FIGS. 1 through 5. In certain examples, aspects of the operations of block 1320 may be performed by a packet transmission component as described with reference to FIGS. 6 through 9.

Figure 14:
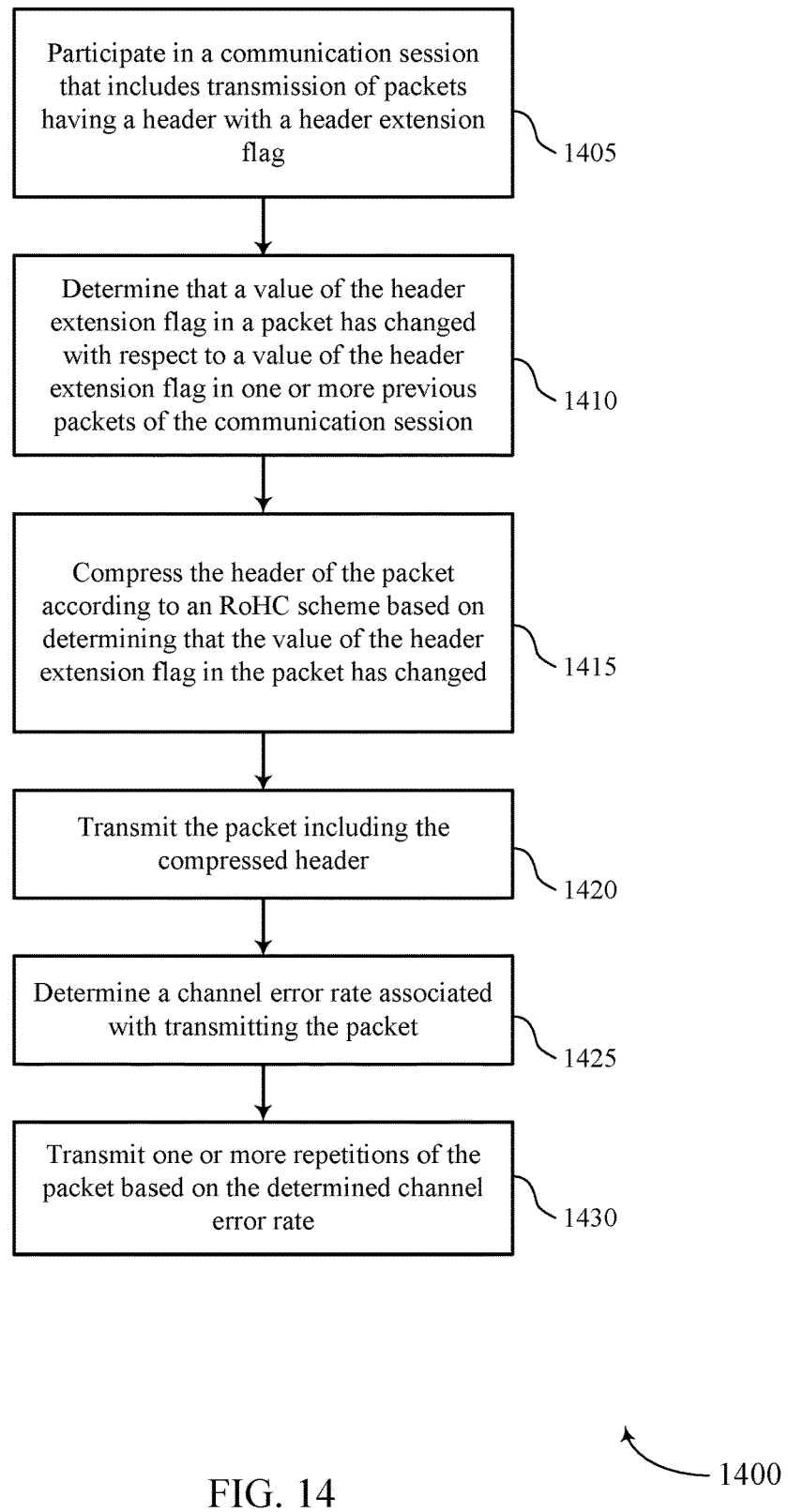

FIG. 14 shows a flowchart illustrating a method 1400 for RoHC techniques for a dynamically changing extension bit in accordance with aspects of the present disclosure. The operations of method 1400 may be implemented by a transmitting device, such as a UE 115, or its components as described herein. For example, the operations of method 1400 may be performed by an RoHC manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may participate in a communication session that includes transmission of packets having a header with a header extension flag. The operations of block 1405 may be performed according to the methods described with reference to FIGS. 1 through 5. In certain examples, aspects of the operations of block 1405 may be performed by a communication session manager as described with reference to FIGS. 6 through 9.

At block 1410 the UE 115 may determine that a value of the header extension flag in a packet has changed with respect to a value of the header extension flag in one or more previous packets of the communication session. The operations of block 1410 may be performed according to the methods described with reference to FIGS. 1 through 5. In certain examples, aspects of the operations of block 1410 may be performed by a header extension manager as described with reference to FIGS. 6 through 9.

At block 1415 the UE 115 may compress the header of the packet according to an RoHC scheme based on determining that the value of the header extension flag in the packet has changed. The operations of block 1415 may be performed according to the methods described with reference to FIGS. 1 through 5. In certain examples, aspects of the operations of block 1415 may be performed by a compressor as described with reference to FIGS. 6 through 9.

At block 1420 the UE 115 may transmit the packet comprising the compressed header. The operations of block 1420 may be performed according to the methods described with reference to FIGS. 1 through 5. In certain examples, aspects of the operations of block 1420 may be performed by a packet transmission component as described with reference to FIGS. 6 through 9.

At block 1425 the UE 115 may determine a channel error rate associated with transmitting the packet. In some cases, the UE 115 may also determine a threshold number of transmitted packets associated with the determine channel error rate. The operations of block 1425 may be performed according to the methods described with reference to FIGS. 1 through 5. In certain examples, aspects of the operations of block 1425 may be performed by a channel error rate component as described with reference to FIGS. 6 through 9.

At block 1430 the UE 115 may transmit one or more repetitions of the packet based on the determined channel error rate. The UE 115 may transmit the one or more repetitions until the threshold number of transmitted packets is satisfied, or until an acknowledgment message is received from a receiving device. In either case, the retransmission of the packet may occur until the UE 115 has determined that a compression context has been updated by the receiving device. The operations of block 1430 may be performed according to the methods described with reference to FIGS. 1 through 5. In certain examples, aspects of the operations of block 1430 may be performed by a packet transmission component as described with reference to FIGS. 6 through 9.

In some examples, aspects from two or more of the methods 1000, 1100, 1200, 1300, or 1400 described with reference to FIG. 10, 11, 12, 13, or 14 may be combined. It should be noted that the methods 1000, 1100, 1200, 1300, or 1400 are just example implementations, and that the operations of the methods 1000, 1100, 1200, 1300, or 1400 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: a, b, or c" is intended to cover a, b, c, a-b, a-c, b-c, and a-b-c., as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    participating in a communication session using a first compression profile that includes transmission of packets having a header with a header extension flag, wherein the header extension flag indicates use of an extended header or a non-extended header;
    determining that a value of the header extension flag in a packet has changed with respect to a value of the header extension flag in one or more previous packets of the communication session;
    determining a frequency of change of the value of the header extension flag based at least in part on determining that the value of the header extension flag has changed, wherein the frequency of change comprises a first frequency or a second frequency that is higher than the first frequency;
    selecting a robust header compression (RoHC) scheme for compressing the header of the packet based at least in part on the frequency of change, wherein the RoHC scheme comprises transmitting packets in an initialization and refresh (IR) state when the frequency of change is the first frequency or using a second compression profile for compressing the header of the packet when the frequency of change is the second frequency;

compressing the header of the packet according to the selected RoHC scheme based at least in part on determining that the value of the header extension flag in the packet has changed; and transmitting the packet comprising the compressed header.

2. The method of claim 1, wherein compressing the header of the packet according to the selected RoHC scheme comprises:

reverting the UE to the IR state; and compressing the header of the packet based at least in part on the UE being in the IR state.

3. The method of claim 1, wherein compressing the header of the packet according to the selected RoHC scheme comprises:

compressing the header using the second compression profile that does not include compression of a Real-Time Transport Protocol (RTP) portion of the header.

4. The method of claim 3, wherein the second compression profile comprises a User Datagram Protocol (UDP) compression profile.

5. The method of claim 3, wherein compressing the header of the packet according to the selected RoHC scheme comprises:

switching from an RTP compression profile to a User Datagram Protocol (UDP) compression profile.

6. The method of claim 1, wherein compressing the header of the packet according to the RoHC scheme comprises:

configuring the packet as an IR packet or an initialization and refresh, dynamic part (IR-DYN) packet comprising the compressed header, wherein the transmitted packet comprises the IR packet or the IR-DYN packet.

7. The method of claim 1, further comprising:

determining a channel error rate associated with transmitting the packet; and transmitting one or more repetitions of the packet based on the determined channel error rate.

8. The method of claim 7, wherein transmitting the one or more repetitions of the packet comprises:

identifying a threshold number of transmitted packets based on the determined channel error rate; and transmitting the one or more repetitions of the packet until the threshold number of transmitted packets is satisfied.

9. The method of claim 7, wherein transmitting the one or more repetitions of the packet comprises:

transmitting the one or more repetitions of the packet until an acknowledgment message is received from a receiving device.

10. The method of claim 1, further comprising:

transmitting one or more repetitions of the packet until a receiving device acknowledges that the receiving device has updated an RoHC context based at least in part on the transmitted packet.

11. The method of claim 1, wherein transmitting the packet comprising the compressed header comprises:

transmitting the packet comprising the compressed header while operating in the IR state, the method further comprising:

remaining in the IR state until the UE determines that a receiving device has updated an RoHC context based at least in part on the transmitted packet.

12. The method of claim 1, wherein the packet comprises a media data packet, the media data packet comprising at least video data or voice data.

13. An apparatus for wireless communications at a user equipment (UE), comprising:

means for participating in a communication session using a first compression profile that includes transmission of packets having a header with a header extension flag, wherein the header extension flag indicates use of an extended header or a non-extended header;

means for determining that a value of the header extension flag in a packet has changed with respect to a value of the header extension flag in one or more previous packets of the communication session;

means for determining a frequency of change of the value of the header extension flag based at least in part on determining that the value of the header extension flag has changed, wherein the frequency of change comprises a first frequency or a second frequency that is higher than the first frequency;

means for selecting a robust header compression (RoHC) scheme for compressing the header of the packet based at least in part on the frequency of change, wherein the RoHC scheme comprises transmitting packets in an initialization and refresh (IR) state when the frequency of change is the first frequency or using a second compression profile for compressing the header of the packet when the frequency of change is the second frequency;

means for compressing the header of the packet according to the selected RoHC scheme based at least in part on determining that the value of the header extension flag in the packet has changed; and means for transmitting the packet comprising the compressed header.

14. An apparatus for wireless communications at a user equipment (UE), in a system comprising:

a processor;

memory in electronic communication with the processor; and one or more instructions stored in the memory and operable, when executed by the processor, to cause the apparatus to:

participate in a communication session using a first compression profile that includes transmission of packets having a header with a header extension flag, wherein the header extension flag indicates use of an extended header or a non-extended header;

determine that a value of the header extension flag in a packet has changed with respect to a value of the header extension flag in one or more previous packets of the communication session;

determine a frequency of change of the value of the header extension flag based at least in part on determining that the value of the header extension flag has changed, wherein the frequency of change comprises a first frequency or a second frequency that is higher than the first frequency;

select a robust header compression (RoHC) scheme for compressing the header of the packet based at least in part on the frequency of change, wherein the RoHC scheme comprises transmitting packets in an initialization and refresh (IR) state when the frequency of change is the first frequency or using a second compression profile for compressing the header of the packet when the frequency of change is the second frequency;

compress the header of the packet to the selected RoHC scheme based at least in part on determining that the value of the header extension flag in the packet has changed; and transmit the packet comprising the compressed header.

15. The apparatus of claim 14, wherein the one or more instructions executable by the processor to compress the header of the packet according to the selected RoHC scheme comprise one or more instructions executable by the processor to:
revert the UE to the IR state; and
compress the header of the packet based at least in part on the UE being in the IR state.

16. The apparatus of claim 14, wherein the one or more instructions executable by the processor to compress the header of the packet according to the selected RoHC scheme comprise one or more instructions executable by the processor to:
compress the header using the second compression profile that does not include compression of a Real-Time Transport Protocol (RTP) portion of the header.

17. The apparatus of claim 16, wherein the second compression profile comprises a User Datagram Protocol (UDP) compression profile.

18. The apparatus of claim 16, wherein the one or more instructions executable by the processor to compress the header of the packet according to the selected RoHC scheme comprise one or more instructions executable by the processor to:
switch from an RTP compression profile to a User Datagram Protocol (UDP) compression profile.

19. The apparatus of claim 14, wherein the one or more instructions executable by the processor to compress the header of the packet according to the RoHC scheme comprise one or more instructions executable by the processor to:
configure the packet as an IR packet or an initialization and refresh, dynamic part (IR-DYN) packet comprising the compressed header, wherein the transmitted packet comprises the IR packet or the IR-DYN packet.

20. The apparatus of claim 14, wherein the one or more instructions are further executable by the processor to:
determine a channel error rate associated with transmitting the packet; and
transmit one or more repetitions of the packet based on the determined channel error rate.

21. The apparatus of claim 20, wherein the one or more instructions executable by the processor to transmit the one or more repetitions of the packet comprises one or more instructions executable by the processor to:
identify a threshold number of transmitted packets based on the determined channel error rate; and
transmit the one or more repetitions of the packet until the threshold number of transmitted packets is satisfied.

22. The apparatus of claim 20, wherein the one or more instructions executable by the processor to transmit the one or more repetitions of the packet comprises one or more instructions executable by the processor to:
transmit the one or more repetitions of the packet until an acknowledgment message is received from a receiving device.

23. The apparatus of claim 14, wherein the one or more instructions are further executable by the processor to:
transmit one or more repetitions of the packet until a receiving device acknowledges that the receiving device has updated an RoHC context based at least in part on the transmitted packet.

24. The apparatus of claim 14, wherein the one or more instructions executable by the processor to transmit the packet comprising the compressed header comprise one or more instructions executable by the processor to:
transmit the packet comprising the compressed header while operating in the IR state, and wherein the one or more instructions are further executable by the processor to:
remain in the IR state until the UE determines that a receiving device has updated an RoHC context based at least in part on the transmitted packet.

25. A non-transitory computer readable medium storing code for wireless communications at a user equipment (UE), the code comprising one or more instructions executable by a processor to:
participate in a communication session using a first compression profile that includes transmission of packets having a header with a header extension flag, wherein the header extension flag indicates use of an extended header or non-extended header;
determine that a value of the header extension flag in a packet has changed with respect to a value of the header extension flag in one or more previous packets of the communication session;
determine a frequency of change of the value of the header extension flag based at least in part on determining that the value of the header extension flag has changed, wherein the frequency of change comprises a first frequency or a second frequency that is higher than the first frequency;
select a robust header compression (RoHC) scheme for compressing the header of the packet based at least in part on the frequency of change, wherein the RoHC scheme comprises transmitting packets in an initialization and refresh (IR) state when the frequency of change is the first frequency or using a second compression profile for compressing the header of the packet when the frequency of change is the second frequency;
compress the header of the packet according to the selected RoHC scheme based at least in part on determining that the value of the header extension flag in the packet has changed; and
transmit the packet comprising the compressed header.

26. The non-transitory computer-readable medium of claim 25, wherein the one or more instructions executable by the processor to compress the header of the packet according to the RoHC scheme comprise one or more instructions executable by the processor to:
revert the UE to the IR state; and
compress the header of the packet based at least in part on the UE being in the IR state.

27. The non-transitory computer-readable medium of claim 25, wherein the one or more instructions executable by the processor to compress the header of the packet according to the RoHC scheme comprise one or more instructions executable by the processor to:
compress the header using the second compression profile that does not include compression of a Real-Time Transport Protocol (RTP) portion of the header.

* * * * *